United States Patent
Austin (10) Patent No.: US 7,281,746 B2
(45) Date of Patent: Oct. 16, 2007

(54) RETROFIT TAILGATE COUNTERBALANCING HINGE

(75) Inventor: Donald Mossom Austin, Perkinsfield (CA)

(73) Assignee: M&C Corporation, Sterling Heights, MI (US)

( * ) Notice: Subject to any disclaimer, the term of this patent is extended or adjusted under 35 U.S.C. 154(b) by 230 days.

(21) Appl. No.: 11/216,082

(22) Filed: Sep. 1, 2005

(65) Prior Publication Data

US 2006/0055197 A1 Mar. 16, 2006

Related U.S. Application Data

(60) Provisional application No. 60/608,632, filed on Sep. 10, 2004.

(51) Int. Cl.
*B60P 1/267* (2006.01)

(52) U.S. Cl. .......................... 296/50; 296/53; 296/57.1

(58) Field of Classification Search .................. 296/50, 296/53, 57.1, 59, 146.1; 16/75, 308; 49/386, 49/389
See application file for complete search history.

(56) References Cited

U.S. PATENT DOCUMENTS

| | | | |
|---|---|---|---|
| 2,395,456 A | 2/1946 | Bunker |
| 2,733,476 A | 2/1956 | Eck |
| 2,799,891 A | 7/1957 | Ragsdale |
| 2,810,153 A | 10/1957 | Semar |
| 2,984,517 A | 5/1961 | Farrow et al. |
| 3,031,225 A | 4/1962 | Saffer et al. |
| 3,085,286 A | 4/1963 | Whitehouse et al. |
| 3,122,775 A | 3/1964 | Pullyblank |
| 3,146,847 A | 9/1964 | Rutman et al. |
| 3,166,783 A | 1/1965 | Mackie et al. |
| 3,336,070 A | 8/1967 | Jackson |
| 3,370,317 A | 2/1968 | Marchione |
| 3,402,508 A | 9/1968 | Kessler |
| 3,643,378 A | 2/1972 | Velavicius et al. |
| 3,649,067 A | 3/1972 | Louton, Jr. |
| 3,695,678 A | 10/1972 | Gergoe |
| 3,699,716 A | 10/1972 | Wanlass |
| 3,787,923 A | 1/1974 | Peterson |
| 4,143,904 A | 3/1979 | Cooper et al. |
| 4,291,501 A | 9/1981 | Steinberg et al. |
| 4,378,658 A | 4/1983 | DeLorean |
| 4,589,164 A | 5/1986 | Leonard |
| 4,701,977 A | 10/1987 | Hori et al. |
| 4,702,511 A | 10/1987 | Olins |
| 4,787,809 A | 11/1988 | Zrostlik |
| 4,845,811 A | 7/1989 | Fargnier |

(Continued)

*Primary Examiner*—Lori L. Lyjak
(74) *Attorney, Agent, or Firm*—Nixon & Vanderhye P.C.

(57) ABSTRACT

A torque rod-based counterbalancing hinge assembly includes a first assembly for securing the torque rod to one side of vehicle's body and supporting the tailgate to the same side of the vehicle's body, and a second assembly for supporting the other end of the tailgate to the other side of the vehicle's body. The first assembly includes a body bracket with an elongated key slot that receives an elongated key of a pivot coupling having an opening for receiving a first end of the torque rod. A retainer assembly including a one-piece construction retainer block receives and secures to the tailgate a second end of the torque rod, so that it twists as the tailgate is rotated. The retainer block has the structural strength necessary to restrain without failing the torque rod as it is twisted and subjected to a torsional force in response to the rotation of the tailgate.

27 Claims, 5 Drawing Sheets

U.S. PATENT DOCUMENTS

| | | |
|---|---|---|
| 4,905,347 A | 3/1990 | Wroth |
| 5,039,154 A | 8/1991 | Lewis |
| 5,358,301 A | 10/1994 | Konchan et al. |
| D370,453 S | 6/1996 | Shortman et al. |
| 5,606,773 A | 3/1997 | Shappell |
| 5,641,262 A | 6/1997 | Dunlop et al. |
| 5,787,549 A | 8/1998 | Soderlund |
| 5,988,724 A | 11/1999 | Wolda |
| 6,283,463 B1 | 9/2001 | Park |
| 6,769,729 B1 | 8/2004 | Bruford et al. |
| 6,793,263 B1 | 9/2004 | Bruford et al. |
| 6,846,030 B2 | 1/2005 | Koehler et al. |
| 6,874,837 B2 | 4/2005 | Bruford et al. |
| 6,905,156 B2 | 6/2005 | Miller et al. |

RETROFIT TAILGATE COUNTERBALANCING HINGE

RELATED APPLICATIONS

This application claims the benefit of Provisional Application Ser. No. 60/608,632, filed Sep. 10, 2004, the entire contents of which are hereby incorporated by reference in this application.

BACKGROUND OF THE INVENTION

The present invention relates to vehicle body closure panels with a counterbalancing hinge having a torque rod with end assemblies forming a pivot connection between the closure panel and vehicle body pillars.

Vehicle body closure members, such as a tailgate, are pivotally mounted between body side panels forming the pillars at the rear of the vehicle. The tailgate pivots about a hinge axis between a horizontal, open position and a vertical, closed position. Preferably, the mounting assemblies for the tailgate permit the tailgate to be removed, and this has been accomplished in a known construction when the tailgate is pivoted to a position between the fully open or fully closed position. For example, the tailgate may include hinge pins that extend outwardly along the hinge axis that removably connect into brackets carried on the truck body. When the tailgate is pivoted to a predetermined intermediate position, for example, 15° away from a fully closed position, at least one of the hinge pins slips through a slot in the connecting bracket as the tailgate is lifted at one end from the truck body.

Some of the tailgate mounting assemblies include a spring bias assist for assisting movement and counterbalancing the weight of a tailgate during opening or closing movements. One previously known mechanism in which a torque rod provides spring biasing between the tailgate and the body panel pillars carries the torque rod on assemblies that form the pivots for the tailgate. Since the torque rod forms a portion of the pivot assembly, the torque rod must be installed for the tailgate to pivot and thus complicates the assembly procedure. Moreover, the torque rod may require particularly configured ends that complicate production of the parts before assembly.

A previously known tailgate assembly may use hinge pin trunnions for pivoting and the torque rod is pre-formed and installed into the tailgate in a complex and intricate procedure. For example, during assembly of the tailgate, the stationary end of the rod has to be aligned with an aperture that exposes the end for attachment outside of the tailgate while the anchoring end is aligned with a reinforcement plate located inside the tailgate. All of the aligning must be performed while the torque rod is carried within the interior of the tailgate and the procedure may be difficult and time consuming. Moreover, numerous components are required to assemble the torque rod to the tailgate. Other types of springs used in place of the torque rod are difficult to install within the confines of tailgates made of inner and outer panels joined together before the hinge assembly is mounted. Moreover, such assemblies may be difficult to repair, and replacement parts are complex and expensive.

One previously known tailgate assembly uses an anchoring member that serves to rotationally ground one end of a torque rod within the interior of a tailgate. The anchoring member is mounted on a hinge bracket, which is attached to the tailgate, and extends into the interior of the tailgate through an aperture. The anchoring member can be a pinch block with a bore formed therein for receiving one end of the torque rod. The pinch block also has a torsion bar retainer, which is a cap fastened to the top of the pinch block by means of rivets or bolt, or the like. The torsion bar retainer, when secured to the top of the pinch block, serves to grounded or non-rotationally lock the torque rod to the pinch block. As a result, the pivoting of the tailgate causes the torsion bar to be subjected to torsional windup sufficient to produce assistance for a vehicle operator opening or closing the tailgate. One advantage of a design in which one end of the torsion bar is grounded within the tailgate is that, even if the torsion bar were to break, the pivoting function of the tailgate system and, for that matter, the retention of a tailgate upon a vehicle, will not be adversely affected by the breakage of the torsion bar. One weakness of this design, however, is that the torsion bar retainer cap is prone to bending and failing in response to the twisting to the torque rod held beneath it. Thus, the tailgate lift assist function provided by the assembly in which this design is used will be lost upon the failure of the torsion bar retainer.

Accordingly, a tailgate hinge assembly that includes a tailgate lift assist assembly in which an end of a torque rod is rotationally and reliably grounded within the interior of the tailgate is needed.

BRIEF DESCRIPTION OF THE INVENTION

The present invention overcomes the above-mentioned disadvantages by providing, in a vehicle tailgate hinge assembly, a tailgate counterbalancing hinge lift assist assembly that reliably grounds an end of an axially elongated torque rod within the interior of a tailgate.

Preferably, the vehicle tailgate assembly includes first and second end assemblies for pivotally supporting the tailgate adjacent to the vehicle's side panels and an axially elongated torque rod that is torsionally loaded to assist with the tailgate lift assist function.

Preferably, the first end assembly secures a first end of the torque rod to one of the vehicle's side panels, while pivotally supporting the tailgate at that same side panel. Preferably, the first assembly includes a first body bracket that is secured to one of the vehicle's side panels with fasteners, although other methods of attachment may be used. The first body bracket includes an elongated key slot that receives an elongated key of a pivot coupling. The pivot coupling includes an opening for receiving a complementary shaped end of the torque rod.

Preferably, a first tailgate bracket attaches to the tailgate with fasteners, although other methods of attachment may be used. The first tailgate bracket includes an opening, through which the stem of a bushing or first hinge cup is inserted and bent over. The first hinge cup is generally cylindrical and includes a cavity in which the pivot coupling is received.

Preferably, a retainer assembly grounds the second end of the torque rod within the tailgate. Preferably, the retainer assembly includes a one-piece construction retainer block for rotationally grounding the second end of the torque rod within the interior of the tailgate. The retainer block has an opening formed within it for receiving the end of the torque rod to be grounded within the tailgate. The one-piece construction of the retainer block provides the structural strength necessary to restrain, without failing, the torque rod when the torque rod experiences the torsional force caused by the torque rod being twisted in response to the tailgate being rotated between open and closed positions.

BRIEF DESCRIPTION OF THE DRAWINGS

The various features and advantages of the present invention will become apparent to those skilled in the art from the following detailed description. The drawings that accompany the detailed description can be briefly described as follows.

DETAILED DESCRIPTION OF THE INVENTION

Figure 1:
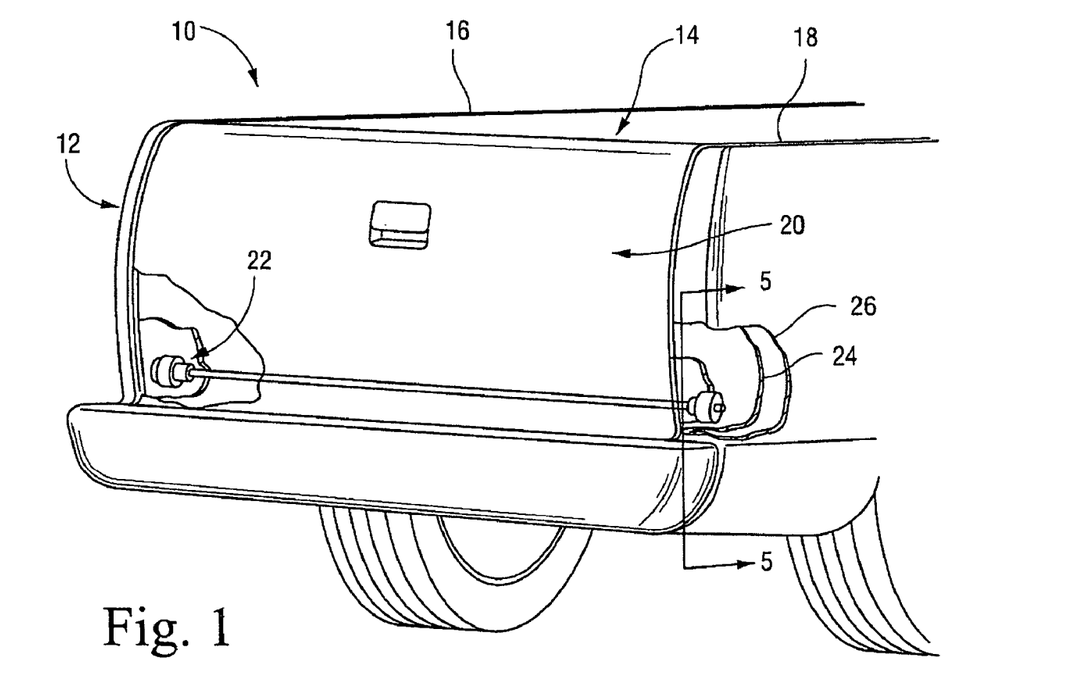
FIG. 1 shows a schematic view of a vehicle and tailgate.

FIG. 1 illustrates a motor vehicle 10 including a vehicle body 12 with a rear compartment or bed 14 enclosed by a left sidewall 16, right sidewall 18, and a tailgate 20. A counterbalance hinge assembly 22 pivotally supports the tailgate 20 between the left sidewall 16 and the right sidewall 18.

The tailgate 20 is pivotally supported between pillars formed by the sidewalls 16 and 18. Typically, as shown in the cutaway in FIG. 1, body panels such as the left sidewall 16 and right sidewall 18 and the tailgate 20 are formed by inner and outer panels 24 and 26, respectively, of sheet metal joined at the ends by overlapping flanges or the like that reinforce the planar expanses of the sheet metal forming the side panel. Of course, other materials may be used in constructing the vehicle body 12 and the counterbalance hinge assembly 22 without departing from the present invention. The invention is not dependent upon the vehicle construction to which it may be applied and may be installed to various different brands of vehicles, even after initial assembly of the vehicle and "retrofit" assembly.

Figure 2:
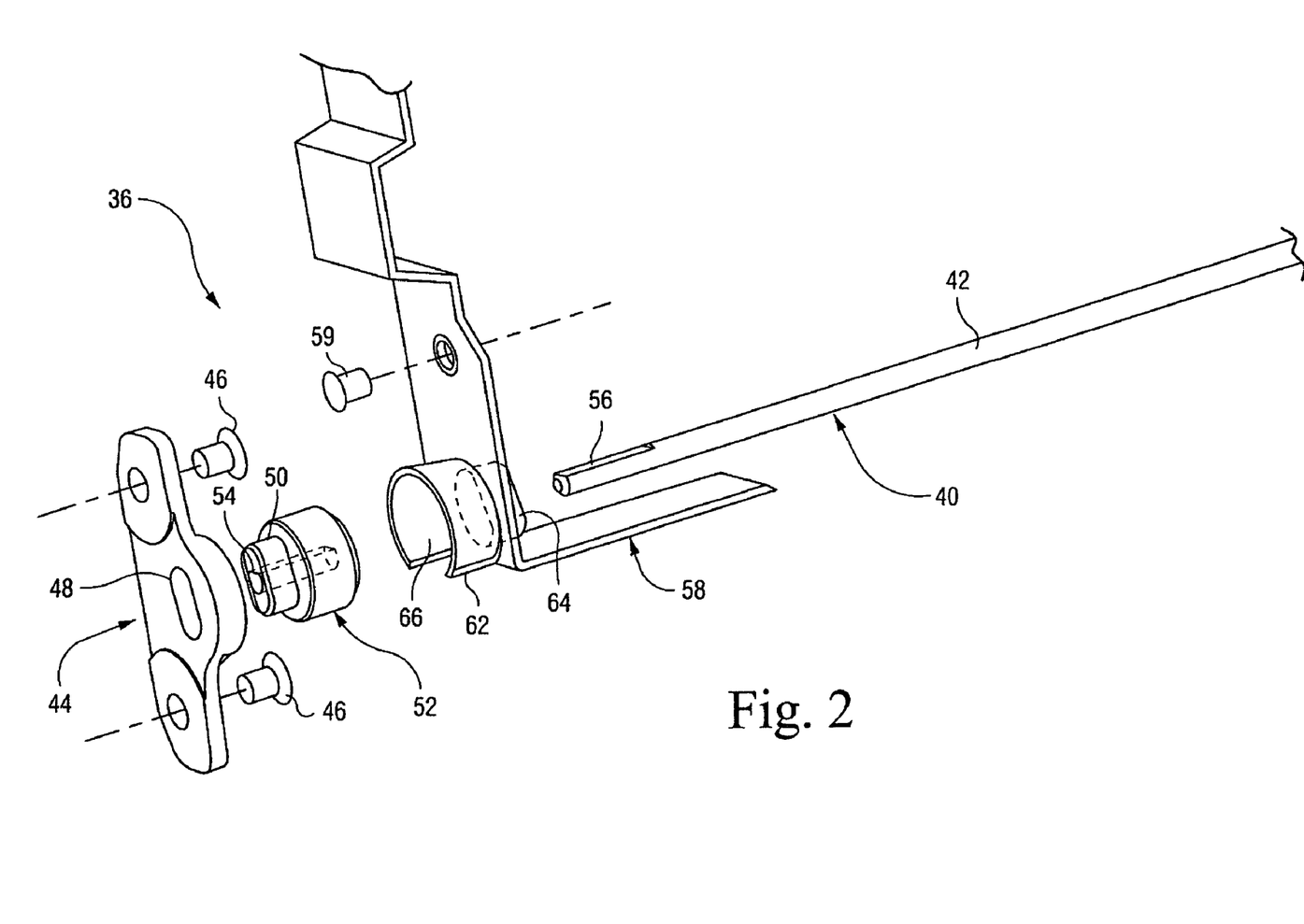
FIG. 2 shows an exploded view of a first assembly of a counterbalance hinge assembly.
Figure 3:
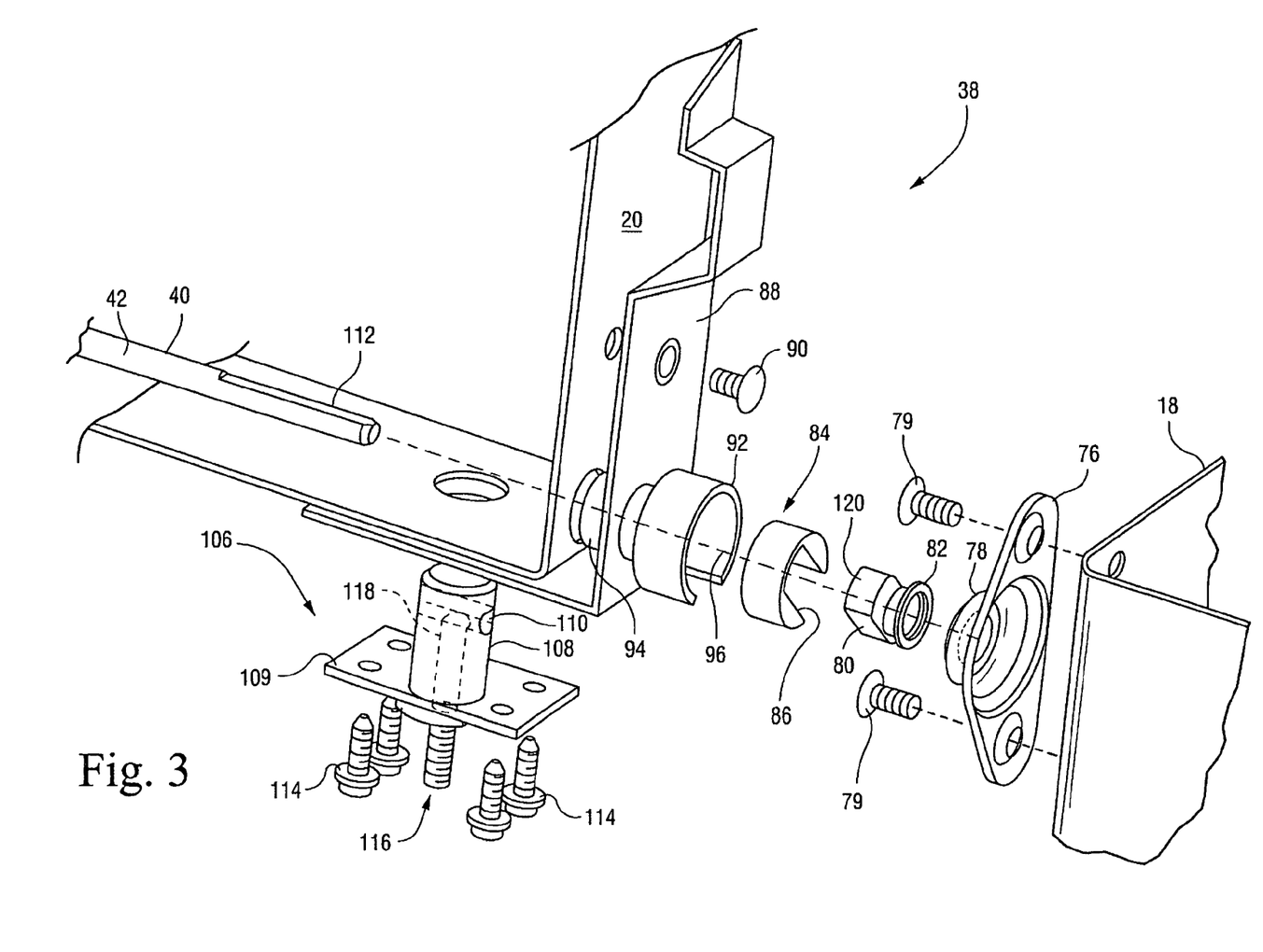
FIG. 3 shows an exploded view of a second assembly of a counterbalance hinge assembly.

FIGS. 2 and 3 illustrate exploded views of a first end assembly 36 and an opposite second end assembly 38, respectively, of the counterbalance hinge assembly 22. The counterbalance hinge assembly 22 comprises an axially elongated torque rod 40 that is aligned along a pivot axis 42 between the left sidewall 16 and right sidewall 18. The first assembly 36 and second assembly 38 enables the torque rod 40 to be secured with respect to the vehicle body 12 and the tailgate 20, respectively. The first and second assemblies 36 and 38, respectively, pivotally support tailgate 20 at the left and right sidewalls 16 and 18, respectively. Of course, other means of mounting the first assembly 36 and second assembly 38 at mating portions of the vehicle body 12 and the tailgate 20 can be used without departing from the scope of the present invention.

The first assembly 36, shown in FIG. 2, secures the torque rod 40 to the vehicle body 12 and pivotably supports the tailgate 20 at the left sidewall 16. It should be understood that, although reference is made to securing to the left sidewall 16, the first assembly 36 may be secured to the right sidewall 18 in other embodiments of the invention. The first assembly 36 includes a first body bracket 44 that is secured to the left sidewall 16 with fasteners 46, although other methods of attachment may be used, such as, but not limited to, welding. The first body bracket 44 includes an elongated key slot 48 that receives an elongated key 50 of a pivot coupling 52. The pivot coupling 52 includes a faceted opening 54 for receiving a correspondingly faceted end 56 of the torque rod 40.

Figure 5:
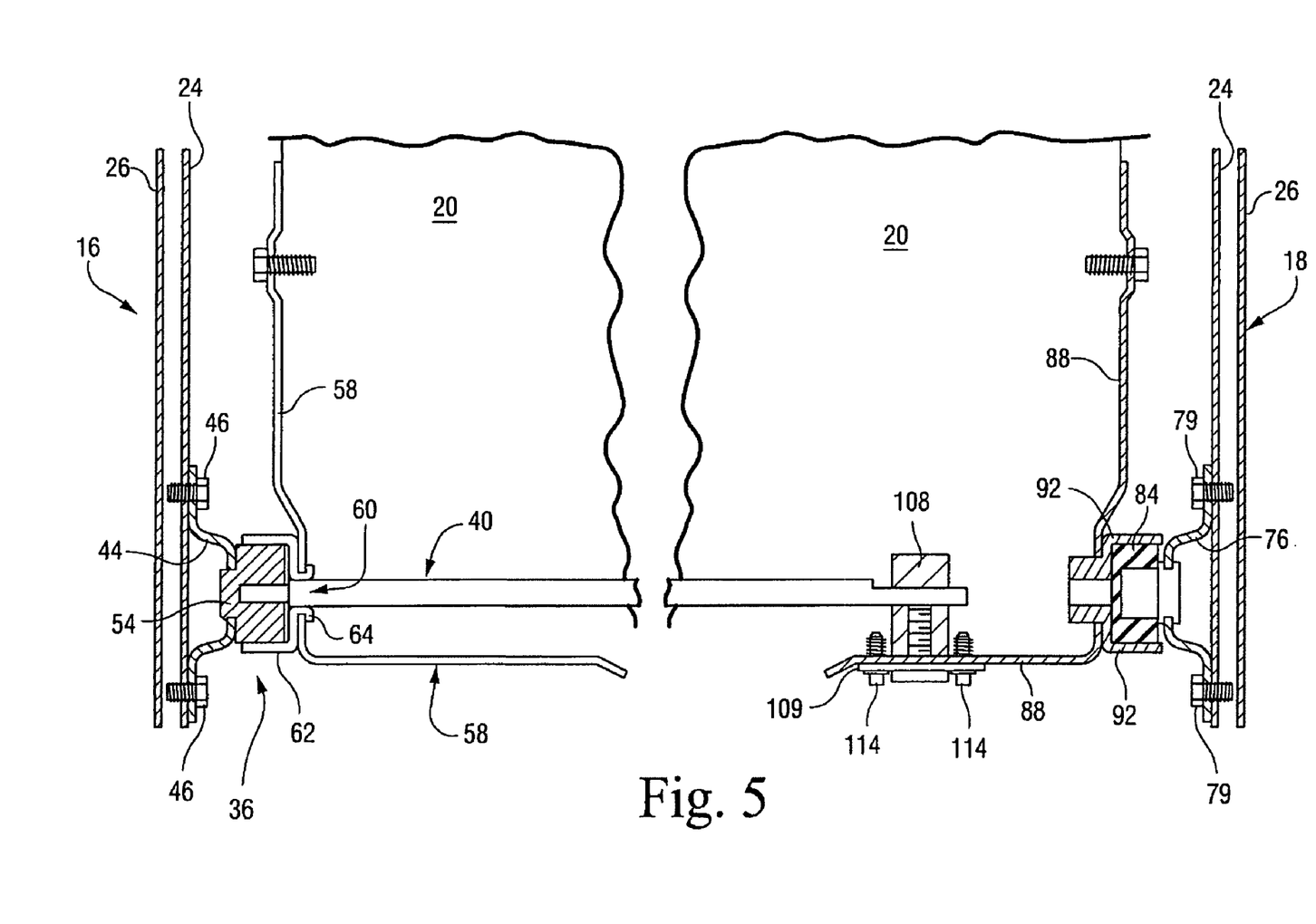
FIG. 5 shows a schematic assembled view of the counterbalance hinge assembly.

A first tailgate bracket 58 attaches to the tailgate 20 with a fastener 59, however, additional fasteners, welding, or other methods of attachment may be used to secure the first tailgate bracket 58 to the tailgate 20. The first tailgate bracket 58 includes an opening 60, through which the faceted end 56 of torque rod 40 passes. A first bushing or hinge cup 62 is located generally coaxially with the opening 60 and preferably secured to the first tailgate bracket 58 by stem 64 being inserted into hole 60 and bent over, as shown in FIG. 5. Other methods of securing first hinge cup 62 to bracket 58 may be used. For example, first hinge cup 62 can be welded to the first tailgate bracket 58. The first hinge cup 62 is generally cylindrical and includes a cavity 66 in which the pivot coupling 52 is received.

The second assembly 38 pivotally supports the tailgate 20 at the right sidewall 18. It is to be understood that although reference is made to the right sidewall 18, the second assembly 38 may be attached to the left sidewall 16 in other embodiments of the invention. The second assembly 38 includes a second body bracket 76 that is secured to the right sidewall 18 with fasteners 79, although other methods of attachment may be used, such as, but not limited to, welding. The second body bracket 76 includes mounting portion 78 that receives an elongated key 80. The elongated key 80 includes a stem 82 for welding or otherwise securing the elongated key 80 to the mounting portion 78. A pivot coupling 84 includes an elongated slot 86, with an open end, for receiving the elongated key 80.

A second tailgate bracket 88 attaches to the tailgate 20 with a fastener 90. However, additional fasteners, welding, or other methods of attachment may be used to secure the second tailgate bracket 88 to the tailgate 20. The second tailgate bracket 88 includes a second hinge cup 92. The second hinge cup 92 is secured to the second tailgate bracket 88 at a stem 94. Preferably, the second hinge cup 92 is welded to the second tailgate bracket 88, however, other methods of securing may be used. The second hinge cup 92 is generally cylindrical and includes a cavity 96 in which the pivot coupling 84 is rotatably received.

A retainer assembly 106 receives the torque rod 40 in the tailgate 20. The retainer assembly 106 includes a one-piece construction retainer block 108 with a faceted opening 110 complementary in shape to a faceted end 112 of the torque rod 40. The retainer block 108 is preferably welded to a mounting plate 109, which, in turn, is secured to second tailgate bracket 88, and thus tailgate 20, with a plurality of fasteners 114. Preferably the fasteners 114 are self tapping screws. A locking or set screw 116 disposed within a screw orifice 118 secures the torque rod 40 within the faceted opening 110, and generally prevents the torque rod 40 from sliding out of the retainer assembly 106.

Figure 4:
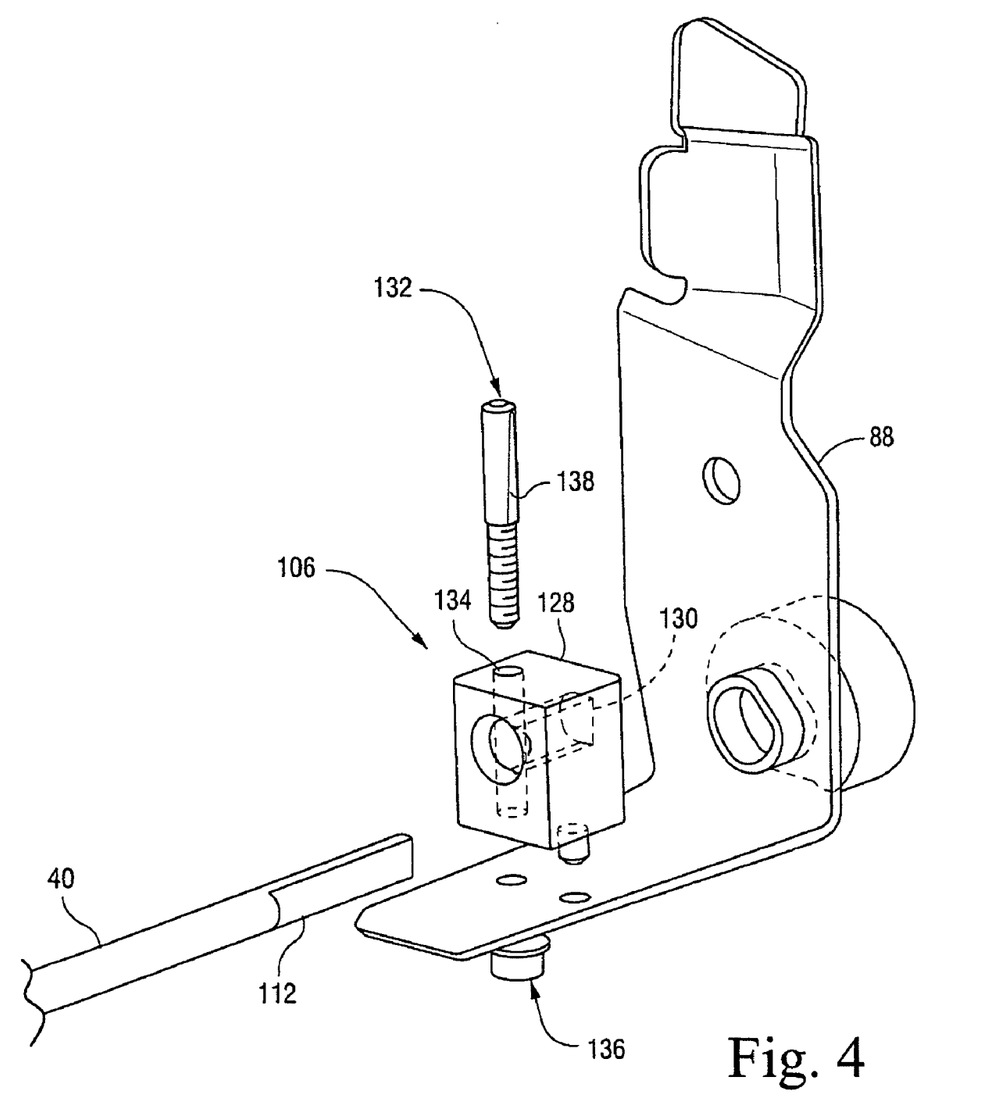
FIG. 4 shows another example of a retainer assembly for the second assembly illustrated in FIG. 3.

FIG. 4 illustrates another example of the retainer assembly 106. The retainer assembly 106 includes a one-piece construction retainer block 128 with a faceted opening 130 complementary in shape to the faceted end 112 of the torque rod 40. The retainer block 128 is secured to second tailgate bracket 88, and thus tailgate 20, with a taper pin 132 installed through a pin opening 134 that partially intersects the faceted opening 130. The taper pin 132 is inserted through the pin opening 134 and secured with a flanged nut 136 that is threaded onto the threaded end of pin 132. The taper pin 132 includes a flat tapered face 138 that locks against the faceted end 112 of torque rod 40 when torque is applied during installation. The locking interference between flat tapered face 138 of taper pin 132 and faceted end 112 of torque rod 40 secures torque rod 40 in the retainer block 128 and generally prevents the torque rod 40 from sliding out of the retainer assembly 106. Although an interference fit with the flat tapered face 138 is shown, other examples may include different types of interference fits between the taper pin 132 and torque rod 40.

The one-piece constructions of retainer blocks 108 and 128 provide the structural strength necessary to restrain torque rod 40 as it is twisted and thus subjected to a torsional force in connection with tailgate 20 being rotated as it is opened and closed. This one-piece construction overcomes the weakness of the known prior design in which a torque rod is terminated in a block including a metal cap secured to the block for the purpose of retaining the end of a torque rod between the block and the cap. Unlike the cap in the prior design, which is prone to bending and failing in response to the twisting of the torque rod held beneath the cap, the one-piece construction of the retainer block used in the present invention provides the structural strength necessary to restrain without failing torque rod 40 as it is twisted. Blocks 108 and 128 can be formed by machining or by a casting of powdered metal.

The end 112 of torque rod 40 is rigidly retained by the retainer assembly 106, so that torque rod 40 rotates with tailgate 20. Thus, as tailgate 20 is rotated between an upright, closed position and a horizontal, open position, the torque rod 40 is forced to twist, since the other faceted end 56 of torque rod 40 is rigidly secured to the left sidewall 16 of vehicle 10 via the first assembly 36. Preferably, the unbiased position of the torque rod 40 occurs when the tailgate 20 is positioned between a fully closed position and a fully open position, whereby spring tension is introduced to pivot the tailgate 20 away from the closed position when it is unlatched, and to raise it to the closed position when it has been unlatched from its open position. The latching of the tailgate 20 in both the closed and the open position could be done in a well known manner without departing from the present invention.

The parts of counterbalance hinge assembly 22, as illustrated in an assembled configuration in FIG. 5, may be assembled by installing the torque rod 40 in the tailgate 20 and attaching the first assembly 36 and second assembly 38 to the left and right sidewalls 16 and 18, respectively. The parts can be positioned before spring tension is applied to the counterbalance hinge assembly 22 by inserting the torque rod 40 into the retainer assembly 106. After mounting the first tailgate bracket 58 and second tailgate bracket 88 to the tailgate 20, the first hinge cup 62 and second hinge cup 92 are attached to the first tailgate bracket 58 and second tailgate bracket 88, respectively, so that the opening 60 is generally aligned with the end of the tailgate 20 and faceted opening 110 of the retainer block 108. This enables the faceted end 112 of the torque rod 40 to be inserted through opening 60 and installed into the faceted opening 110 of the retainer block 108. The pivot coupling 52 is attached to the faceted end 56 of the torque rod 40 and is received into the cavity 66 of the first hinge cup 62 as the torque rod is inserted into the tailgate 20. The set screw 116 in retainer block 108 is then tightened against torque rod 40.

The tailgate is then positioned for installation on the vehicle 10. The elongated key slot 48, which is for example angled 10° open, receives the elongated key 50 of the pivot coupling 52. Then the tailgate is pivoted to an intermediate angle, for example 45° towards open relative to the vertical position, to align the elongated slot 86 of the pivot coupling 84 in the second hinge cup 92 with the elongated key 80. The tilted tailgate 20 is then lowered to engage the elongated key 80 into the elongated slot 86.

The assembly discussed above provides a mechanism for removably mounting a tailgate between spaced apart body side panels of a vehicle body. Accordingly, the torque rod is twisted in tension when the tailgate is pivoted to either the closed or open positions from the removal position. This tension provides a counterbalancing effort to assist with pivotal movement of the tailgate. Nevertheless, because the assembly includes a retainer assembly that uses a one-piece construction retainer block, the retainer assembly has the structural strength necessary to restrain without failing the torque rod as it experiences the torsional force caused by the torque rod being twisted in response to the opening and closing of the tailgate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A retainer assembly for attaching to a tailgate, operated with a torque rod-based counterbalancing hinge assembly, one end of the torque rod, the retainer assembly comprising a retainer block including a first opening for receiving the end of the torque rod and having a construction capable of restraining the torque rod as it is twisted and thus subjected to a torsional force in connection with the tailgate being rotated.

2. The retainer assembly recited in claim 1, wherein the retainer block has a one-piece construction that provides a strength capable of restraining the torque rod as it is twisted and subjected to the torsional force.

3. The retainer assembly recited in claim 1, wherein the retainer block is attached to a mounting bracket that is secured to the tailgate.

4. The retainer assembly recited in claim 1, further comprising a screw orifice in the retainer block intersecting the first opening and a screw within the screw orifice engaging the first end of the torque rod to secure the torque rod within the first opening.

5. The retainer assembly recited in claim 1, further comprising a mounting plate to which the retainer block is attached, the mounting plate being secured to the tailgate.

6. The retainer assembly recited in claim 5, wherein the mounting plate is secured to a mounting bracket that is attached to the tailgate.

7. The retainer assembly recited in claim 6, wherein the retainer block is welded to the mounting plate.

8. The retainer assembly recited in claim 1, wherein the first opening has a shape that is complementary to a shape of the first end of the torque rod so that the first end of the torque rod can be inserted into the first opening.

9. The retainer assembly recited in claim 1, wherein the first end of the torque rod has a faceted shape and the first opening has a faceted shape that is complementary to the faceted shape of the first end of the torque rod.

10. The retainer assembly recited in claim 1, further comprising a second opening intersecting the first opening and a screw within the second opening engaging the first end of the torque rod to secure the torque rod within the first opening.

11. The retainer assembly recited in claim 10, wherein the screw is a locking screw or a set screw.

12. The retainer assembly recited in claim 3, further comprising a second opening partially intersecting the first opening and a pin installed through the second opening to secure the retainer block to the mounting bracket.

13. The retainer assembly recited in claim 12, wherein the pin is secured with a flanged nut.

14. The retainer assembly recited in claim 12, wherein the first end of the torque rod has a faceted shape and the first opening has a faceted shape that is complementary to the faceted shape of the first end of the torque rod, and wherein the pin includes a tapered flat face that locks against the faceted end of the torque rod when torque is applied during installation so as to secure the torque rod in the retainer block.

15. The retainer assembly recited in claim 14, wherein there is an interference fit between the pin's tapered flat face and the torque rod that prevents the torque rod from sliding out of the retainer block.

16. A retainer assembly for attaching within a tailgate operated with a torque rod-based counterbalancing hinge assembly one end of the torque rod, the retainer assembly comprising:
    a one-piece construction retainer block, the retainer block including a first opening for receiving the end of the torque rod,
    a second opening in the retainer block intersecting the first opening and containing a screw or a pin engaging the first end of the torque rod to secure the torque rod within the first opening, and
    a mounting plate to which the retainer block is attached, the mounting plate being attached to a mounting bracket that is secured to the tailgate.

17. The retainer assembly recited in claim 16, wherein the first opening receiving the first end of the torque rod has a shape that is complementary to the shape of the first end of the torque rod.

18. The retainer assembly recited in claim 16, wherein the second opening is a screw orifice containing a locking screw or a set screw that engages the first end of the torque rod to secure the torque rod within the first opening.

19. The retainer assembly recited in claim 16, wherein the second opening partially intersects the first opening, the retainer assembly further comprising a taper pin installed through the second opening to secure the retainer block to the mounting bracket, whereby an interference fit between the taper pin and the torque rod prevents the torque rod from sliding out of the retainer block.

20. An assembly for removably mounting a tailgate between spaced apart body side panels of a vehicle body, the mounting assembly including a torque rod based counterbalancing hinge assembly and a retainer assembly for attaching to the tailgate one end of the torque rod, the mounting assembly comprising:
    first and second tailgate brackets secured to first and second ends of the tailgate, each of the tailgate brackets having a hinge cup thereon;
    first and second elongated keys for pivotally supporting the tailgate to first and second sidewalls, respectively, of the vehicle;
    at least one of said hinge cups including a pivot element with an elongated slot therein for receiving one of said elongated keys;
    an axially elongated torque rod having at least one end in engagement with one of said first and second elongated keys; and
    a retainer assembly for receiving an end of the torque rod and being secured to the tailgate, the retainer assembly comprising a retainer block including a first opening for receiving the end of the torque rod and having a construction capable of restraining the torque rod as it is twisted and thus subjected to a torsional force in connection with the tailgate being rotated.

21. An assembly for securing a torque rod of a tailgate counterbalancing hinge assembly to a sidewall of a vehicle, the assembly comprising:
    a bracket secured to the sidewall, the bracket including an elongated key slot, and
    a pivot coupling including an elongated key for insertion into the elongated key slot, and an opening for a correspondingly shaped end of the torque rod is inserted.

22. The assembly of claim 21, wherein the pivot coupling opening is faceted, and wherein the end of the torque rod inserted into the opening is correspondingly faceted.

23. The assembly of claim 21, further comprising:
    a mounting bracket secured to the tailgate,
    a bushing including a cavity for receiving the pivot coupling, the bushing further including a stem for mounting the bushing to the mounting bracket.

24. The assembly of claim 21, wherein the stem is inserted within a hole in the mounting bracket, the hole having a shape complementing a shape of the stem.

25. An end assembly for supporting a tailgate operated with a torque rod-based counterbalancing hinge assembly at sidewall of a vehicle, and for securing the torque rod to the sidewall, the end assembly comprising:
    a body bracket secured to the sidewall, the body bracket including an elongated key slot,
    a pivot coupling including an elongated key, the elongated key being inserted in the elongated key slot, the pivot coupling further including a faceted opening for receiving a correspondingly faceted end of the torque rod,
    a mounting bracket secured to the tailgate,
    a hinge cup including a cavity for receiving the pivot coupling, the hinge cup including a stem inserted within a correspondingly-shaped opening within the mounting bracket for mounting the hinge cup to the mounting bracket.

26. The assembly of claim 21, wherein the body bracket is secured to the sidewall with a plurality of fasteners.

27. The assembly of claim 21, wherein the body bracket is secured to the sidewall by welding.

* * * * *